(12) United States Patent
Nakamura

(10) Patent No.: US 8,242,657 B2
(45) Date of Patent: Aug. 14, 2012

(54) SUPERCONDUCTIVE ROTOR, SUPERCONDUCTIVE ROTATING MACHINE AND SUPERCONDUCTIVE ROTATING-MACHINE SYSTEM

(75) Inventor: Taketsune Nakamura, Kyoto (JP)

(73) Assignee: Kyoto University, Kyoto (JP)

( * ) Notice: Subject to any disclaimer, the term of this patent is extended or adjusted under 35 U.S.C. 154(b) by 136 days.

(21) Appl. No.: 12/933,112
(22) PCT Filed: Dec. 26, 2008
(86) PCT No.: PCT/JP2008/073733
§ 371 (c)(1), (2), (4) Date: Dec. 10, 2010
(87) PCT Pub. No.: WO2009/116219
PCT Pub. Date: Sep. 24, 2009

(65) Prior Publication Data
US 2011/0084566 A1 Apr. 14, 2011

(30) Foreign Application Priority Data
Mar. 18, 2008 (JP) ................................. 2008-069521

(51) Int. Cl.
*H02K 17/00* (2006.01)
(52) U.S. Cl. ........................ 310/211; 310/162; 310/125
(58) Field of Classification Search ................... 310/52, 310/125, 162, 211
See application file for complete search history.

(56) References Cited

U.S. PATENT DOCUMENTS 3,898,490 A * 8/1975 Wedman ........................ 310/52
3,916,229 A * 10/1975 Litz et al. ........................ 310/52

(Continued)

FOREIGN PATENT DOCUMENTS

JP 64-47565 U 3/1989

(Continued)

OTHER PUBLICATIONS

International Preliminary Report on Patentability for PCT Patent App. No. PCT/JP2008/073733 (Nov. 2, 2010).

(Continued)

*Primary Examiner* — Thanh Lam
(74) *Attorney, Agent, or Firm* — Cermak Nakajima LLP; Tomoko Nakajima

(57) ABSTRACT

The main problem to be solved by the invention is to provide a superconductive rotor, a superconductive rotating machine and a superconductive rotating-machine system which are capable of inductive and synchronous rotation while employing the induction machine configuration and also offer satisfactory heat dissipation performance, stability under an excessive load, and easy magnetic flux trap for synchronous rotation. To solve the problem, the invention provides a superconductive rotor, as shown in FIG. 1, including a superconductive squirrel-cage winding formed by superconductive wires having a plurality of superconductive wires covered with a highly conductive metal; a normally conductive squirrel-cage winding formed by a normally conductive material; a cylindrical rotor core having a plurality of slots for accommodating the rotor bars of both of the squirrel-cage windings; and a rotor shaft coaxially provided to the rotor core, wherein, when the superconductive squirrel-cage winding is in a non-superconductive state, rotations are mainly made by an induced torque generated on the normally conductive squirrel-cage winding due to a rotating magnetic field and, when the superconductive squirrel-cage winding is in a superconductive state, rotations are mainly made by a synchronous torque generated by the superconductive squirrel-cage winding trapping magnetic flux of the rotating magnetic field.

20 Claims, 8 Drawing Sheets

U.S. PATENT DOCUMENTS

| | | | | |
|---|---|---|---|---|
| 4,037,123 A * | 7/1977 | Mole et al. | ............ | 310/52 |
| 4,087,711 A * | 5/1978 | Kirtley et al. | ............ | 310/184 |
| 4,885,494 A | 12/1989 | Higashi | | |
| 5,325,002 A | 6/1994 | Rabinowitz et al. | | |
| 5,492,752 A | 2/1996 | Parsons et al. | | |
| 5,653,798 A | 8/1997 | Parsons et al. | | |
| 6,711,422 B2 * | 3/2004 | Mawardi | ............ | 505/166 |
| 6,791,229 B2 * | 9/2004 | Mawardi | ............ | 310/211 |
| 2004/0155551 A1 * | 8/2004 | Mawardi | ............ | 310/211 |

FOREIGN PATENT DOCUMENTS

| | | |
|---|---|---|
| JP | 1-144346 A | 6/1989 |
| JP | 8-505515 A | 6/1996 |

OTHER PUBLICATIONS

International Search Report for PCT Patent App. No. PCT/JP2008/073733 (Feb. 10, 2009).

* cited by examiner

A

B

C

SUPERCONDUCTIVE ROTOR, SUPERCONDUCTIVE ROTATING MACHINE AND SUPERCONDUCTIVE ROTATING-MACHINE SYSTEM

This application is a national phase entry under 35 U.S.C. §371 of PCT Patent Application No. PCT/JP2008/073733, filed on Dec. 26, 2008, which claims priority under 35 U.S.C. §119 to Japanese Patent Application No. 2008-069521, filed on Mar. 18, 2008, both of which are incorporated by reference.

TECHNICAL FIELD

The present invention relates to superconductive rotors, superconductive rotating machines and superconductive rotating-machine systems.

BACKGROUND ART

As electric equipment, rotating machines are classified as direct- and alternating-current machines. Among them, the alternating-current machines generate alternating-current power by receiving mechanical power or generate mechanical power by receiving alternating-current power, and they are mainly classified as induction and synchronous machines.

The induction machine, e.g., an induction motor, rotates by generating an induced torque on a rotor with a rotating magnetic field generated by applying alternating-current voltage to a stator winding. The induction motor is widely used because of, for example, its simplified structure, easy maintenance and low cost, but it has disadvantages in terms of efficiency and speed control.

The synchronous machine, e.g., a synchronous motor, rotates by a rotor, which includes an electric or permanent magnet, being attracted by a rotating magnetic field generated by applying alternating-current voltage to a stator winding. The synchronous motor is efficient but requires additional devices for start-up and pulling into synchronism.

Therefore, in recent years, there have been proposed superconductive rotating machines capable of synchronous rotation while having induction machine configurations (see, for example, Patent Documents 1 and 2).

The rotating machine described in Patent Document 1, as shown in, for example, FIG. 6 therein, includes a stator 60, a rotor 61 rotatably attached to the stator 60, a superconductive material 62 provided to the rotor 61, a magnetic field generator provided to the stator 60 to form a rotational magnetic field, a mechanism for trapping in the superconductive material 62 a magnetic field penetrating through the superconductive material 62, and a torque shield 64 disposed between the magnetic field generator and the superconductive material 62, which has such a skin depth and thickness as to keep the magnetic field intensity in the superconductive material 62 lower than a second critical magnetic field $Hc_2$, and also has sufficient electrically conductive properties to produce enough torque to accelerate the rotor 61 to synchronous speed.

At start-up, the rotating machine described in Patent Document 1 is inductively rotated by an induced torque generated on the torque shield 64. Then, when a predetermined speed is reached, magnetic flux in the rotational magnetic field extends through the torque shield 64 into the superconductive material 62. Thereafter, when the superconductive material 62 is cooled to a critical temperature or lower and brought into superconductive state, the magnetic flux in the rotational magnetic field is trapped in the superconductive material 62, so that the rotating machine described in Patent Document 1 is synchronously rotated.

On the other hand, the electric motor described in Patent Document 2, as shown in, for example, FIGS. 3 and 4 therein, has a superconductive material 13 filling both hollow portions 10 of bars and grooves 11 and 12 in end rings 5 within a squirrel-cage winding made of a normally conductive material. Specifically, the electric motor described in Patent Document 2 has a structure in which a squirrel-cage winding made of a normally conductive material is provided together with a closed circuit acting as a field winding made of a superconductive material.

The electric motor described in Patent Document 2 can be started as an ordinary squirrel-cage induction machine with satisfactory start-up characteristics by starting it up in the atmosphere at room temperature. Also, upon completion of acceleration after the start-up, the squirrel-cage rotor is cooled to or below a critical temperature of the superconductive material to form a closed circuit of the superconductive material, so that the rotor is automatically pulled into synchronization, and thereafter can operate with extremely high efficiency as a synchronous motor under constant current.

Patent Document 1: Japanese National Phase PCT Laid-Open Publication No. 8-505515
Patent Document 2: Japanese Laid-Open Patent Publication No. 1-144346

DISCLOSURE OF THE INVENTION

Problems to be Solved by the Invention

[Rotating Machine Described in Patent Document 1]

The rotating machine described in Patent Document 1 realizes the synchronous mode by trapping magnetic flux in the superconductive material. While the superconductive material is described as being in the form of particulate, foil, lump (bulk) or thin film, lump is the only possible final choice for effectively trapping magnetic flux in the superconductive material of the rotor structure described in Patent Document 1. In addition, if the superconductive material is a lump (not wound), it is unlikely that all magnetic flux being trapped contributes to torque generation, and therefore efficiency in torque generation is low considering the amount of superconductive material used.

Furthermore, while there are described two possible methods for trapping magnetic flux in the superconductive material of the rotating machine described in Patent Document 1, these methods have their respective problems as described below.

In the first method, to trap magnetic flux supplied from a primary winding in a superconductive material, the temperature is set higher than a critical temperature of the superconductive material, and then lowered below the critical temperature when the rotor reaches a predetermined rotating speed in the induction mode, thereby trapping magnetic flux. However, this method requires the temperature to be set higher than the critical temperature upon each trapping of magnetic flux. The process of raising/lowering the temperature requires a relatively long period of time, and therefore there are concerns about deterioration in responsiveness of the entire machine.

Also, in the second method, the superconductive material is preset below the critical temperature, and thereafter when a predetermined rotating speed is reached, a pulsed magnetic field higher than or equal to a second critical magnetic field ($Hc_2$) which breaks the superconductive state of the superconductive material, is applied from a primary or auxiliary winding, thereby trapping magnetic flux. However, this method is further problematic in that the second critical magnetic field is generally several teslas even at liquid nitrogen temperatures, and it is not easy to produce a coil which realizes such a magnetic field in a space limited in terms of pulses. Also, there are concerns that, depending on the pulse size, heat might be generated in the superconductive material, so that magnetic flux escapes, resulting in reduced trapping efficiency. In fact, pulsed-field magnetization of superconductive bulk materials has been under study worldwide but has not yet been established as completed technology. In addition, since a magnetic field of several teslas is generated in a limited space although it is pulsed, other elements might be adversely affected. To avoid the influence of the magnetic field, magnetic shielding is generally required, so that the entire machine structure becomes large and complicated.

[Electric Motor Described in Patent Document 2]

In the electric motor described in Patent Document 2, the winding is made of a superconductive material, but conceivably, a superconductive bulk material is contemplated as the superconductive material. If the superconductive material is a bulk material, the following problems arise.

(1) Poor heat dissipation performance upon heat generation.

(2) As in the case of the rotating machine described in Patent Document 1, once the superconductive state is brought about, it is difficult to bring about the state of loss called "magnetic flux flow" due to a large current capacity. Specifically, when the superconductive winding is in the superconductive state without trapping magnetic flux, it is not possible to take an approach to trap magnetic flux after temporarily bringing about the state of magnetic flux flow. Therefore, to synchronously rotate the electric motor when the superconductive winding is in the superconductive state with magnetic flux being left untrapped, it is necessary, as in the case of the rotating machine described in Patent Document 1, to raise the temperature to or above a critical temperature or apply a magnetic field higher than or equal to a critical magnetic field, thereby breaking the superconductive state, and then to trap magnetic flux before setting the temperature down to the critical temperature or lower again, thereby bringing about the superconductive state.

(3) To configure the superconductive winding, it is necessary to fill hollow portions of a normally conductive squirrel-cage winding with superconductive powder and then bake the powder. However, baking the superconductive powder together with a rotor core after the filling requires a large electric furnace. Also, since the rotor core is baked together, a characteristic change might occur. Furthermore, even if the baking is completed without any problem, electric motor production cost increases.

As described in (1) through (3) above, the electric motor described in Patent Document 2 has major problems, and therefore there have been no superconductive rotating machines available that are capable of synchronous rotation while being configured as induction machines.

The present invention has been made in view of the above circumstances, and an objective thereof is to provide a superconductive rotor, a superconductive rotating machine and superconductive rotating-machine system which are capable of inductive and synchronous rotation while employing the induction machine configuration and also offer satisfactory heat dissipation performance and easy magnetic flux trap for synchronous rotation.

Solution to the Problems

To solve the above problems, the present invention provides (1) a superconductive rotor disposed to be rotated in a stator for generating a rotating magnetic field, comprising: a superconductive squirrel-cage winding formed by rotor bars and end rings, the rotor bars including one or more superconductive wires having a plurality of superconductive wires covered with a highly conductive metal; a normally conductive squirrel-cage winding formed by rotor bars and end rings, which are made of a normally conductive material; a cylindrical rotor core having a plurality of slots for accommodating the rotor bars of both of the squirrel-cage windings; and a rotor shaft coaxially provided to the rotor core, wherein, when the superconductive squirrel-cage winding is in a non-superconductive state, rotations are mainly made by an induced torque generated on the normally conductive squirrel-cage winding due to a rotating magnetic field and, when the superconductive squirrel-cage winding is in a superconductive state, rotations are mainly made by a synchronous torque generated by the superconductive squirrel-cage winding trapping magnetic flux of the rotating magnetic field.

The present invention also provides (2) the superconductive rotor based on the above configuration wherein the superconductive wire is made of a low-temperature superconductor based on a metal as typified by NbTi or $Nb_3Sn$, a high-temperature superconductor based on an oxide as typified by yttrium or bismuth, or a magnesium diboride superconductor, and the highly conductive metal is silver, copper, gold, aluminum, or an alloy thereof.

The present invention also provides (3) the superconductive rotor based on the above configuration wherein the normally conductive squirrel-cage winding is formed by increasing the thickness of the highly conductive metal in the superconductive squirrel-cage winding to a predetermined value or more, and is integrated with the superconductive squirrel-cage winding.

The present invention also provides (4) the superconductive rotor based on the configuration (1) or (2) wherein the superconductive squirrel-cage winding and the normally conductive squirrel-cage winding are provided independently of each other, and the superconductive squirrel-cage winding has a larger cage than that of the normally conductive squirrel-cage winding so that the rotor bars thereof are positioned outside the rotor bars of the normally conductive squirrel-cage winding.

The present invention also provides (5) the superconductive rotor based on the configuration (1) or (2) wherein the superconductive squirrel-cage winding and the normally conductive squirrel-cage winding are provided independently of each other, and the normally conductive squirrel-cage winding has a larger cage than that of the superconductive squirrel-cage winding so that the rotor bars thereof are positioned outside the rotor bars of the superconductive squirrel-cage winding.

The present invention also provides (6) the superconductive rotor based on the above configuration wherein the number of rotor bars of the superconductive squirrel-cage winding and the number of rotor bars of the normally conductive squirrel-cage winding are equal to the number of the slots in the rotor core, and each of the slots accommodates one rotor bar of each of the superconductive squirrel-cage winding and the normally conductive squirrel-cage winding.

The present invention also provides (7) a superconductive rotating machine having a superconductive rotor of any of the configurations (1) through (6) disposed in a stator including a stator winding for generating a rotating magnetic field.

The present invention also provides (8) the superconductive rotating machine based on the configuration (7) wherein the stator winding is made of a superconductive material, and the superconductive material has a critical temperature higher than or equal to a critical temperature of the superconductive wires included in the superconductive squirrel-cage winding.

The present invention also provides (9) a superconductive rotating-machine system comprising a superconductive rotating machine of the configuration (7), a cooling device capable of cooling the superconductive rotating machine to a superconductive state, and a control device for controlling the superconductive rotating machine, wherein, the control device has a first control pattern to be used when the superconductive rotating machine is mainly rotated by the induced torque and a second control pattern to be used when the superconductive rotating machine is mainly rotated by the synchronous torque, such that the superconductive rotating machine is controlled using the second control pattern when a value of current flowing through the stator winding falls due to the superconductive squirrel-cage winding being brought into a superconductive state, and when otherwise, the superconductive rotating machine is controlled using the first control pattern.

The present invention also provides (10) the superconductive rotating-machine system based on the configuration (9), wherein, when the superconductive squirrel-cage winding is in the superconductive state without trapping magnetic flux of the rotating magnetic field at start-up, the control device changes a voltage applied to the stator winding and/or a frequency of the applied voltage such that current flowing through the superconductive squirrel-cage winding exceeds a critical level, thereby bringing the superconductive squirrel-cage winding into a state of magnetic flux flow, allowing the magnetic flux of the rotating magnetic field to link the superconductive squirrel-cage winding.

Effect of the Invention

The superconductive rotating machine of the present invention has the superconductive squirrel-cage winding formed using a superconductive wire, rather than a superconductive bulk material, and therefore offers satisfactory heat dissipation performance upon heat generation.

In addition, the superconductive bulk material has a large current capacity, and therefore is difficult to be in the state of magnetic flux flow once it is brought into the superconductive state. On the other hand, the superconductive squirrel-cage winding of the superconductive rotating machine according to the present invention is made using a superconductive wire having a small current capacity, and therefore it can be readily brought into the state of magnetic flux flow. Thus, even when the superconductive squirrel-cage winding is in the superconductive state without trapping magnetic flux, the superconductive rotating machine of the present invention can achieve synchronous rotation by temporarily bringing the superconductive squirrel-cage winding into the state of magnetic flux flow and thereby allowing easy trapping of interlinkage magnetic flux.

Figure 1:
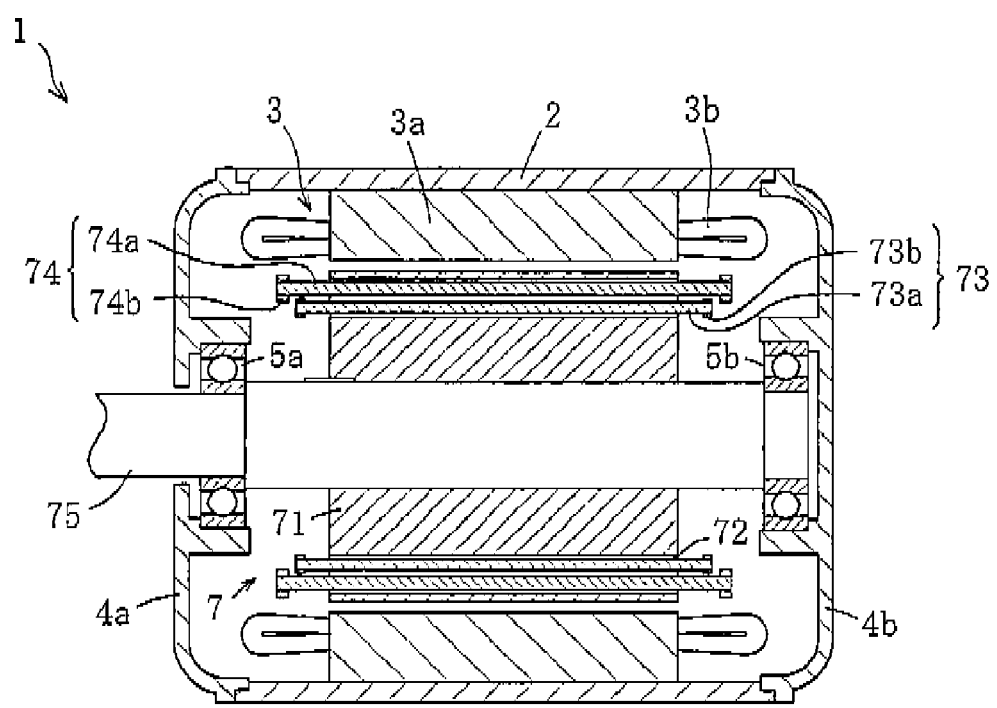
FIG. 1 is a longitudinal cross-section end view of a superconductive electric motor according to the present embodiment.

DESCRIPTION OF THE REFERENCE CHARACTERS 1 superconductive electric motor (superconductive rotating machine)
7 superconductive rotor
71 rotor core
72 slot
73 superconductive squirrel-cage winding
74 normally conductive squirrel-cage winding
75 rotor shaft
73a, 74a rotor bar

BEST MODE FOR CARRYING OUT THE INVENTION

Hereinafter, a preferred embodiment of the present invention will be described with reference to the drawings.

Figure 2:
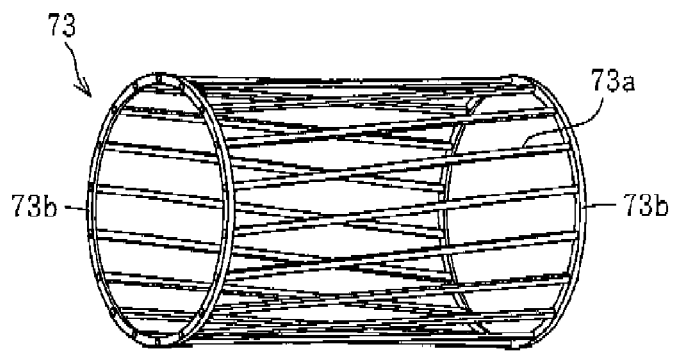
FIG. 2 provides views (A), (B) and (C) respectively illustrating a superconductive squirrel-cage winding, a normally conductive squirrel-cage winding and a rotor core of the superconductive electric motor in FIG. 1.
Figure 2:
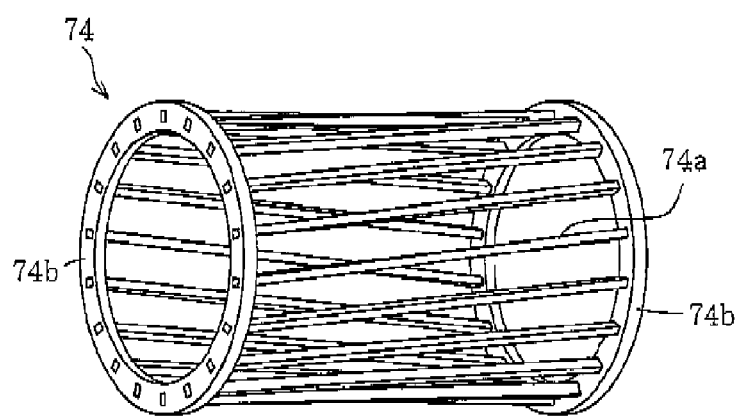
Figure 2:
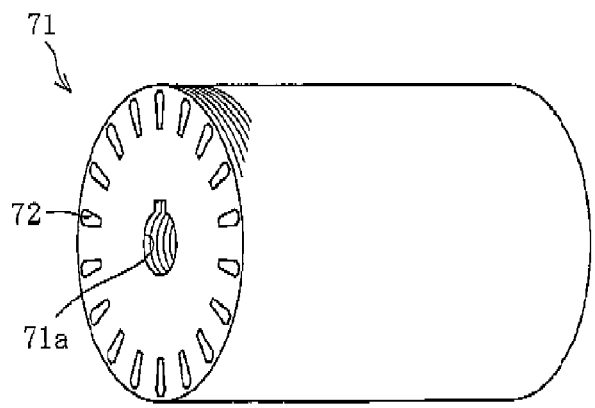
Figure 3:
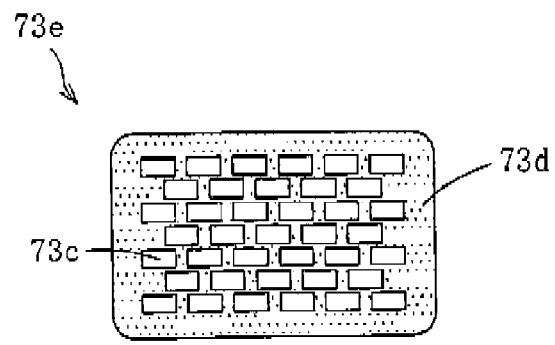
FIG. 3 is a schematic view illustrating in horizontal cross-section of a superconductive wire included in the superconductive squirrel-cage winding in FIG. 2.
Figure 4:
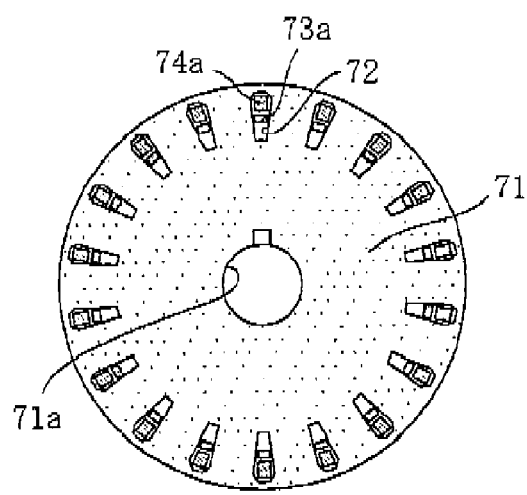
FIG. 4 is a horizontal cross-sectional view of a rotor of the superconductive electric motor in FIG. 1.
Figure 5:
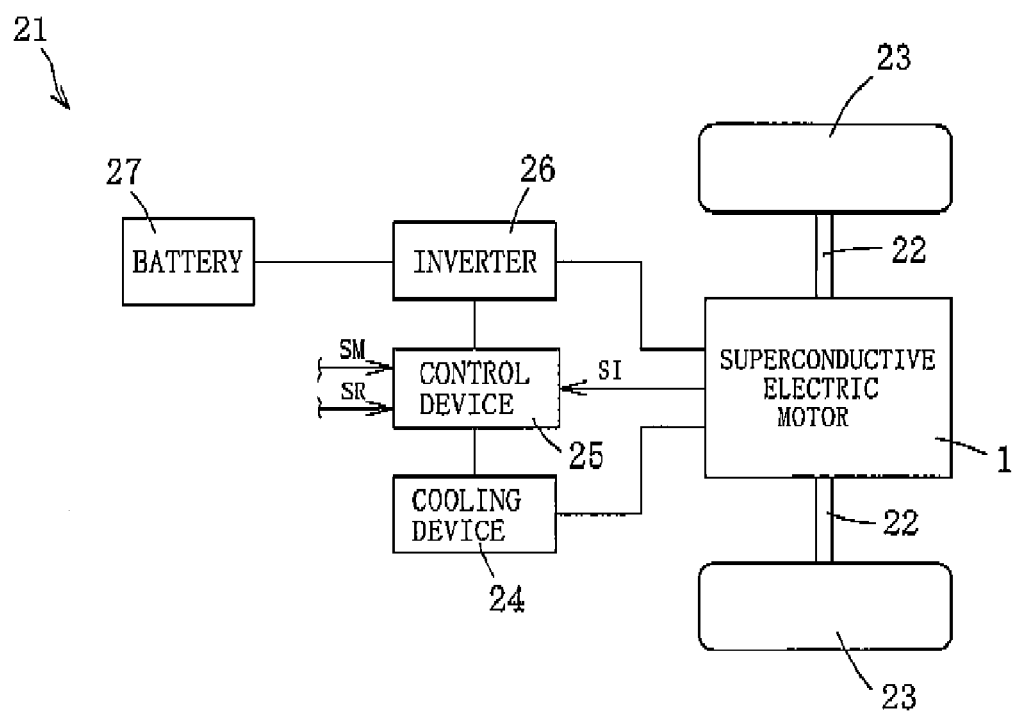
FIG. 5 is a block diagram illustrating an exemplary superconductive electric motor system to which the superconductive electric motor in FIG. 1 is applied.

FIG. 1 is a longitudinal cross-section end view of a superconductive electric motor according to the present invention. FIG. 2 provides views (A), (B) and (C) respectively illustrating a superconductive squirrel-cage winding, a normally conductive squirrel-cage winding and a rotor core of the superconductive electric motor in FIG. 1. FIG. 3 is a schematic view illustrating in horizontal cross-section a superconductive wire included in the superconductive squirrel-cage winding in FIG. 2. FIG. 4 is a horizontal cross-sectional view of a rotor of the superconductive electric motor in FIG. 1, and FIG. 5 is a block diagram illustrating a superconductive electric motor system to which the superconductive electric motor in FIG. 1 is applied.

[Superconductive Electric Motor]

As shown in FIG. 1, the superconductive electric motor (superconductive rotating machine) 1 of the present invention includes a cylindrical casing 2, a circular stator 3 provided on the inner circumference of the casing 2, disk-like brackets 4a and 4b for closing openings at opposite ends of the casing 2, and a superconductive rotor 7 rotatably supported by the brackets 4a and 4b via shaft supports 5a and 5b.

The stator 3 includes a circular stator core 3a formed by axially laminating electromagnetic steel plates such as silicon steel plates, and a stator winding 3b provided in a slot (not shown) of the stator core 3a. Also, the stator winding 3b is made of a normally conductive material.

The superconductive rotor 7 is disposed at a predetermined clearance inside the stator 3. The superconductive rotor 7 includes a hollow-cylindrical rotor core 71, a superconductive squirrel-cage winding 73 having rotor bars 73a accommodated in slots 72 of the rotor core 71, a normally conductive squirrel-cage winding 74 similarly having rotor bars 74a accommodated in the slots 72 of the rotor core 71, and a rotating shaft 75 coaxially attached to the rotor core 71.

The rotor core 71 is formed by axially laminating electromagnetic steel plates such as silicon steel plates as shown in FIG. 2C. The rotor core 71 has formed at the center a rotating shaft-receiving hole 71a for receiving the rotating shaft 75. Also, the rotor core 71 has the slots 72 circumferentially formed at predetermined intervals so as to axially pass through the core in the vicinity of the periphery thereof.

Note that, in general, the slots 72 are formed in a tilted-slot (skewed) arrangement oblique to the axial direction of the rotor core 71.

The superconductive squirrel-cage winding 73 includes the rotor bars 73a accommodated in the slots 72 of the rotor core 71 and circular end rings 73b for shorting the opposite ends of each rotor bar 73a, as shown in FIG. 2A.

The rotor bars 73a are each composed of a bundle of superconductive wires (in the present embodiment, bismuth-based high-temperature superconductive wires) 73e and has a rectangular cross section (but is not limited to the rectangular cross section). The superconductive wires 73e are formed by a plurality of bismuth-based high-temperature superconductive filaments 73c covered with a highly conductive metal 73d such as copper, aluminum, silver or gold, as shown in FIG. 3. The number of rotor bars 73a is equal to the number of slots 72 of the rotor core 71. The rotor bars 73a are circumferentially disposed at predetermined intervals to form a cylindrical cage with a skewed structure, in a direction oblique to the axial direction of the cage. The rotor bars 73a are formed longer than the axial length of the rotor core 71 so as to project from the slots 72 when they are accommodated in the slots 72, as shown in FIG. 1.

Similar to the rotor bars 73a, the end rings 73b are composed of superconductive wires 73e such as bismuth-based high-temperature superconductive wires. The end rings 73b are each joined with the ends of the rotor bars 73a projecting from the slots 72.

The normally conductive squirrel-cage winding 74 consists of the rotor bars 74a accommodated in the slots 72 of the rotor core 71 and the circular end rings 74b for shorting the opposite ends of the rotor bars 74a, as shown in FIG. 2B.

The rotor bars 74a are made of a high-conductivity material, such as copper, aluminum, silver or gold, and has a rectangular cross section (but is not limited to the rectangular cross section). The number of rotor bars 74a is equal to the number of the slots 72 of the rotor core 71. The rotor bars 74a are circumferentially disposed at predetermined intervals to form a cylindrical cage with a skewed structure, which is larger than in the case of the superconductive squirrel-cage winding 73, in a direction oblique to the axial direction of the cage. The rotor bars 74a are formed longer than the axial length of the rotor core 71 so as to project from the slots 72 when they are accommodated in the slots 72, as shown in FIG. 1. The rotor bars 74a are inserted into the slots 72 so as to be positioned outside the rotor bars 73a of the superconductive squirrel-cage winding 73, as shown in FIGS. 2 and 4.

Similar to the rotor bars 74a, the end rings 74b are made of a high-conductivity material such as copper, aluminum, silver or gold. The end rings 74b are each joined to the ends of the rotor bars 74a projecting from the slots 72.

The rotating shaft 75 is inserted and attached in the rotating shaft-receiving hole 71a of the rotor core 71. The rotating shaft 75 is rotatably supported by the brackets 4a and 4b via the shaft supports 5a and 5b such as bearings.

In the superconductive electric motor 1 thus configured, when the superconductive squirrel-cage winding 73 is in a normally conductive state (non-superconductive state), induced current flows to the normally conductive squirrel-cage winding 74 due to the rotating magnetic field caused by the stator 3, thereby generating an induced torque. At this time, the superconductive electric motor 1 is mainly rotated by the induced torque, and exerts torque characteristics corresponding to the "inductive rotation (normally conductive state)" in FIG. 7.

Note that in the state where the superconductive electric motor 1 is inductively rotated, a fraction of the induced current flows to the superconductive squirrel-cage winding 73. However, since the induced current flowing to the normally conductive squirrel-cage winding 74 is significantly larger, the induced torque generated at the normally conductive squirrel-cage winding is dominant over the induced torque generated at the superconductive squirrel-cage winding 73.

On the other hand, in the superconductive electric motor 1, when the superconductive squirrel-cage winding 73 transitions from the normally conductive state to the superconductive state, a synchronous torque is generated by the superconductive squirrel-cage winding 73 trapping magnetic flux of the rotating magnetic field caused by the stator 3 (see FIG. 8C). At this time, the superconductive electric motor 1 is mainly rotated by the synchronous torque, and exerts torque characteristics corresponding to the "synchronous rotation (superconductive state)" in FIG. 7.

Note that in some cases, a very slight slip might occur due to connection resistance between the rotor bars 73a and the end rings 73b during the synchronous rotation, and such a case may be considered as synchronous rotation in view of device characteristics.

Also, even if an excessive load is applied to the superconductive electric motor 1 in the synchronous rotation state, the superconductive squirrel-cage winding 73 transitions to the state of magnetic flux flow (see FIG. 8B) to allow the motor to continue its operation through main driving with the induced torque. The induced torque at this time is provided by both the superconductive squirrel-cage winding 73 in the state of magnetic flux flow and the normally conductive squirrel-cage winding 74, so that torque characteristics corresponding to the "inductive rotation (superconductive state)" in FIG. 7 are exerted.

Figure 7:
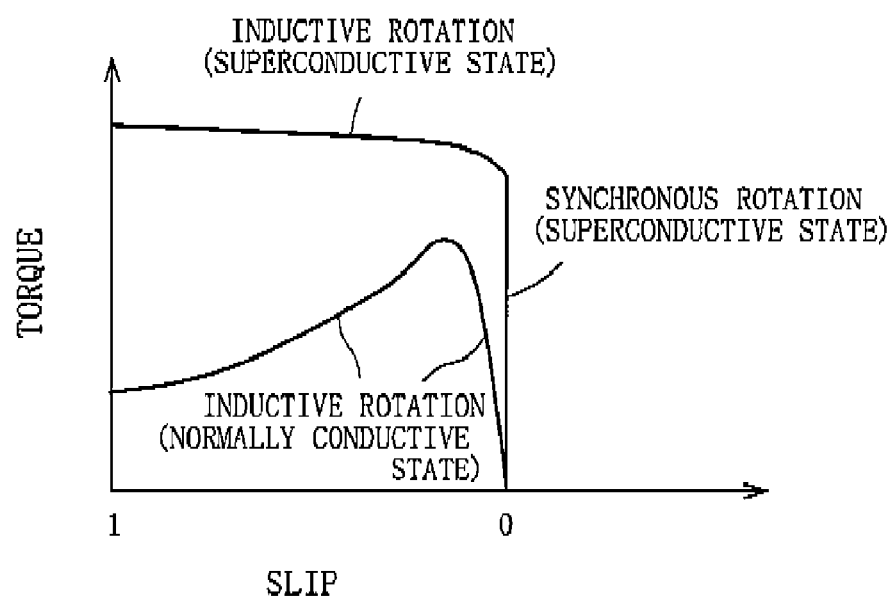
FIG. 7 is a graph illustrating torque characteristics for the superconductive electric motor in FIG. 1.
Figure 8:
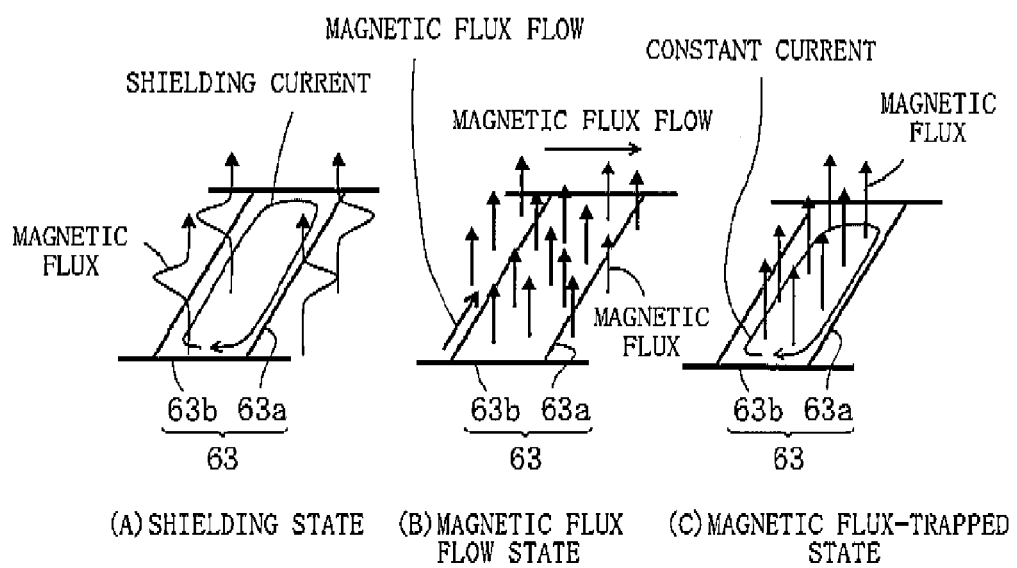
FIG. 8 provides schematic diagrams illustrating electromagnetic phenomena for the superconductive squirrel-cage winding in FIG. 2.

Specifically, the superconductive electric motor 1 has torque characteristics as shown in FIG. 7, and is mainly rotated by an induced torque during the normally conductive state, while during the superconductive state, the motor is mainly rotated by a synchronous torque when the load is normal and by an induced torque when the load is excessive.

[Superconductive Electric Motor System]

The superconductive electric motor 1 thus configured can be mounted on, for example, a vehicle, as shown in FIG. 5, and used in a superconductive electric motor system 21. The superconductive electric motor system 21 includes the superconductive electric motor 1 coupled to wheels 23 via an axle 22, a cooling device 24 capable of cooling the superconductive electric motor 1 to the superconductive state, a control device 25 for controlling the cooling device 24 in accordance with a cooling signal SR and controlling the superconductive electric motor 1 via an inverter 26 in accordance with an electric motor drive signal SM, and a battery 27 for driving the superconductive electric motor 1.

The cooling device 24 supplies a cooling medium to the slots 72 of the superconductive rotor 7 via a cooling medium supply path (not shown) provided in the rotating shaft 75 and the rotor core 71 within the superconductive electric motor 1. As a result, the cooling device 24 can cool the superconductive squirrel-cage winding 73 in the superconductive electric motor 1 below a critical temperature. As the cooling medium, helium gas, liquid nitrogen or the like is used.

The control device 25 controls drive of the superconductive electric motor 1 via the inverter 26 in accordance with the electric motor drive signal SM. At this time, the control device 25 controls the voltage V and the frequency f of an alternating-current voltage, which is applied to the stator winding 3b of the superconductive electric motor 1, via the inverter 26. As a result, the control device 25 performs feedback control of the rotating speed and the torque of the superconductive electric motor 1.

The control device 25 has prestored therein an inductive rotation control pattern (first control pattern) used for mainly rotating the superconductive electric motor 1 by an induced torque and a synchronous rotation control pattern (second control pattern) used for mainly rotating the superconductive electric motor 1 by a synchronous torque. The inductive rotation control pattern is a known control pattern used for conventional induction motors. Similarly, the synchronous rotation control pattern is a known control pattern used for conventional synchronous motors.

Also, the control device 25 receives a constant input of a primary current signal SI, which is a signal of primary current flowing in the stator winding 3b, from the superconductive electric motor 1. In addition, the control device 25 has stored therein a threshold $I_{TH}$ for the primary current signal SI, for each ratio V/f of the voltage V to the frequency f of the alternating-current voltage applied to the stator winding 3b.

The threshold $I_{TH}$ is intended for determining whether or not the superconductive squirrel-cage winding 73 is in the superconductive state (whether the superconductive electric motor 1 is mainly rotated by a synchronous torque), and is set in the following manner.

Figure 6:
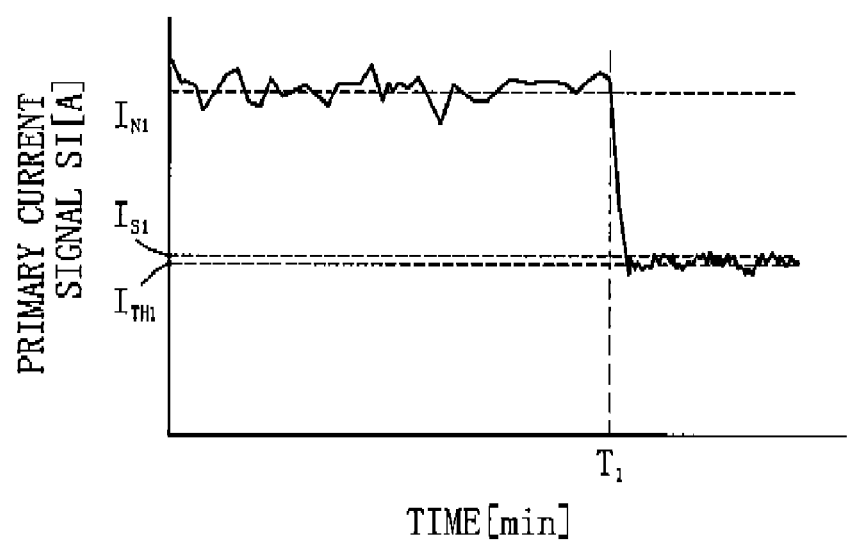
FIG. 6 is a graph illustrating primary current for the superconductive electric motor in FIG. 1.

First, the superconductive electric motor 1 is operated in steady state, i.e., in the normally conductive state, at an arbitrary V/f ratio, e.g., $V_1/f_1$. At this time, the primary current signal SI has a roughly constant value $I_{N1}$, as shown in FIG. 6. Then, the cooling device 24 is activated and driven until the superconductive electric motor 1 is brought into the superconductive state. After a predetermined period of time $T_1$, when the superconductive squirrel-cage winding 73 is brought into the superconductive state, the value of the primary current signal SI falls to $I_{S1}$. Then, the threshold $I_{TH1}$ is set to a value slightly lower than the value of $I_{S1}$ (e.g., 90% of $I_{S1}$). This operation is performed for each V/f ratio to obtain all thresholds $I_{TH}$.

Note that the phenomenon in which the value of the primary current falls when the superconductive squirrel-cage winding 73 is brought into the superconductive state is due to the superconductive electric motor 1 transitioning from inductive rotation to synchronous rotation at that time. Specifically, while excess current is required for maintaining the state of slip during the inductive rotation, such excess current is not required during the synchronous rotation, and therefore the value of the primary current falls.

The control device 25 determines whether or not the superconductive electric motor 1 is mainly rotated by a synchronous torque based on whether the value of the constantly inputted primary current signal SI is lower or higher than the threshold $I_{TH}$. Specifically, when the value $I_S$ of the primary current signal SI is lower than the threshold $I_{TH}$, the superconductive electric motor 1 is determined to be mainly rotated by the synchronous torque and the synchronous rotation control pattern is applied thereto, and when otherwise, the superconductive electric motor 1 is determined to be mainly rotated by the induced torque and the inductive rotation control pattern is applied thereto.

Note that the reason why $I_{TH}$ is set to a value slightly lower than $I_S$ is that, if $I_{TH}$ is conversely set to a value higher than $I_S$, the synchronous rotation control pattern might be applied to the superconductive electric motor 1, which in fact is being inductively rotated but is not considered as such due to fluctuations of the primary current signal SI, which interrupts the operation. On the other hand, by setting $I_{TH}$ to a value slightly lower than $I_S$, the superconductive electric motor 1 is operated without problems, although the inductive rotation control pattern is applied to the superconductive electric motor 1 which in fact is being synchronously rotated.

Also, when the superconductive squirrel-cage winding 73 is in the superconductive state without trapping magnetic flux of the rotating magnetic field caused by the stator winding 3b, the control device 25 is supposed to increase a voltage applied to the stator winding 3b and/or the frequency of the applied voltage, such that the superconductive squirrel-cage winding 73 is brought into the state of magnetic flux flow. The superconductive squirrel-cage winding 73 is temporarily brought into the state of magnetic flux flow, thereby trapping interlinkage magnetic flux even if the temperature is lower than a critical temperature. This will be described in detail below with reference to FIG. 8.

For example, when the superconductive squirrel-cage winding 73 is cooled below the critical temperature by the cooling device 24 before it is activated, the superconductive squirrel-cage winding 73 is set in the superconductive state without the stator winding 3b trapping magnetic flux. In such a state, if an alternating-current voltage is applied to the stator winding 3b, shielding current flows in the superconductive squirrel-cage winding 73, so that no magnetic flux interlinks the superconductive squirrel-cage winding 73 and the normally conductive squirrel-cage winding 74 (see FIG. 8A). Specifically, in this case, since no synchronous torque is generated and no induced current flows in the normally conductive squirrel-cage winding 74, no induced torque is generated either. Accordingly, in this state, the superconductive electric motor 1 cannot be operated.

Therefore, the control device 25 is used to increase the voltage applied to the winding 3b and/or the frequency of the applied voltage until the shielding current flowing in the superconductive squirrel-cage winding 73 exceeds the critical current, thereby bringing the superconductive squirrel-cage winding 73 into the state of magnetic flux flow. In the state of magnetic flux flow, finite resistance is generated, and therefore even if the temperature is less than the critical temperature, magnetic flux can interlink the superconductive squirrel-cage winding (see FIG. 8B).

Thereafter, the superconductive rotor 7 is accelerated, and if the rotating magnetic field correspondingly has a low relative velocity to the superconductive rotor 7, the current flowing in the superconductive squirrel-cage winding 73 is automatically reduced. Ultimately, when the current flowing in the superconductive squirrel-cage winding 73 falls below the critical current, the superconductive squirrel-cage winding 73 traps the interlinkage magnetic flux (see FIG. 8C).

The superconductive electric motor system 21 thus configured is used in the following manner.

(1) Activation at Normal Temperature

First, the operator performs an operation to input an electric motor drive signal SM to the control device 25. The control device 25 drives the superconductive electric motor 1 in accordance with the signal SM. At this time, the superconductive electric motor 1 is in the normally conductive state, and therefore is mainly rotated by an induced torque.

Then, the control device 25 detects the constantly inputted primary current signal SI to be higher than a threshold $I_{TH}$ corresponding to the operating condition V/f, thereby detecting the superconductive electric motor 1 to be in the normally conductive state. Subsequently, the control device 25 applies the inductive rotation control pattern to the superconductive electric motor 1 which is mainly rotated by the induced torque, thereby controlling drive of the superconductive electric motor 1. Specifically, in the normally conductive state, the superconductive electric motor 1 acts as an induction motor, thereby exerting torque characteristics corresponding to the "inductive rotation (normally conductive state)" in FIG. 7.

On the other hand, after the operation is started, when the operator performs an operation to start cooling, a cooling signal SR is inputted to the control device 25. The control device 25 drives the cooling device 24 in accordance with the signal SR. The cooling device 24 supplies a cooling medium such as helium gas to the superconductive squirrel-cage winding 73 of the superconductive electric motor 1, thereby cooling the superconductive squirrel-cage winding 73 below the critical temperature. Even after the cooling device 24 is driven, the superconductive electric motor 1 still acts as an induction motor until the superconductive squirrel-cage winding 73 is cooled below the critical temperature.

After a predetermined period of time, when the superconductive squirrel-cage winding 73 is cooled below the critical temperature and is brought into the superconductive state, the superconductive electric motor 1 is mainly rotated by the synchronous torque as described earlier.

At this time, the control device 25 detects the constantly inputted primary current signal SI to be lower than the threshold $I_{TH}$ corresponding to the operating condition V/f, thereby detecting the superconductive electric motor 1 to be in the superconductive state. Then, the control device 25 applies the synchronous rotation control pattern to the superconductive electric motor 1 being mainly rotated by the synchronous torque, thereby controlling drive of the superconductive electric motor 1. Specifically, in the superconductive state, the superconductive electric motor 1 exerts torque characteristics corresponding to the "synchronous rotation (superconductive state)" in FIG. 7.

(2) Activation Below the Critical Temperature

First, the operator performs an operation to input an electric motor drive signal SM to the control device 25. The control device 25 attempts to drive the superconductive electric motor 1 in accordance with the signal SM. At this time, however, the superconductive electric motor 1 is in the superconductive state, and therefore even if an alternating-current voltage is applied to the stator winding 3b, shielding current flows in the superconductive squirrel-cage winding 73, and therefore no magnetic flux interlinks the superconductive squirrel-cage winding 73 and the normally conductive squirrel-cage winding 74, so that the superconductive electric motor 1 does not operate.

In this case, the control device 25 increases the voltage applied to the stator winding 3b and/or the frequency of the applied voltage until the shielding current flowing in the superconductive squirrel-cage winding 73 exceeds critical current, thereby bringing the superconductive squirrel-cage winding 73 into the state of magnetic flux flow. In the state of magnetic flux flow, magnetic flux can interlink the superconductive squirrel-cage winding even if the temperature is below the critical temperature, as described earlier.

Thereafter, the superconductive rotor 7 is accelerated, and if the rotating magnetic field correspondingly has a low relative velocity to the superconductive rotor 7, the current flowing in the superconductive squirrel-cage winding 73 is automatically reduced. Ultimately, when the current flowing in the superconductive squirrel-cage winding 73 falls below the critical current, the superconductive squirrel-cage winding 73 traps the interlinkage magnetic flux. Then, the superconductive electric motor 1 is mainly rotated by the synchronous torque.

At this time, the control device 25 detects the constantly inputted primary current signal SI to fall below the threshold $I_{TH}$ corresponding to the operating condition V/f, thereby detecting the superconductive electric motor 1 to be in the superconductive state. Then, the control device 25 applies the synchronous rotation control pattern to the superconductive electric motor 1 being mainly rotated by the synchronous torque, thereby controlling drive of the superconductive electric motor 1. Specifically, in the superconductive state, the superconductive electric motor 1 is synchronously rotated, and exerts torque characteristics corresponding to the "synchronous rotation (superconductive state)" in FIG. 7.

[Effect]

The superconductive electric motor 1 thus configured can have as simple a structure as conventional induction motors and therefore it is easy to maintain and can be provided at low cost.

Also, since inductive and synchronous rotation is possible, highly efficient operation is possible during synchronous rotation while inductive rotation is possible both in the case where synchronization is lost for some reason and in a period before the superconductive state is brought about.

In addition, the superconductive electric motor 1 has the superconductive squirrel-cage winding 73 made using superconductive wires rather than using a superconductive bulk material, and therefore can offer satisfactory heat dissipation performance upon heat generation.

Furthermore, the superconductive bulk material has a large current capacity, and therefore is difficult to be brought into the state of magnetic flux flow once it is brought into the superconductive state. On the other hand, the superconductive squirrel-cage winding 73 of the superconductive electric motor 1 is made using superconductive wires having a low current capacity, and therefore can be readily brought into the state of magnetic flux flow. Thus, in the superconductive electric motor 1, even when the superconductive squirrel-cage winding 73 is in the superconductive state without trapping magnetic flux, synchronous rotation can be readily achieved by temporarily bringing the superconductive squirrel-cage winding 73 into the state of magnetic flux flow, thereby trapping interlinkage magnetic flux.

Moreover, the superconductive electric motor system 21 can readily detect whether or not the superconductive electric motor 1 is in the superconductive state (whether or not it is mainly rotated by the synchronous torque) based on whether the value of the primary current signal SI constantly inputted to the control device 25 is lower or higher than the threshold $I_{TH}$. Thus, the superconductive electric motor system 21 can have the inductive rotation control pattern and the synchronous rotation control pattern applied suitably in accordance with rotational conditions of the superconductive electric motor 1, which eliminates the need to perform complicated controls.

[Variant]

While an embodiment of the present invention has been specifically described, the following variants of the present invention can be carried out.

For example, the superconductive wire is not limited to a bismuth-based high-temperature superconductive wire, and can be a metal-based low-temperature superconductive wire as typified by NbTi or $Nb_3Sn$, an yttrium-based high-temperature superconductive wire, or a magnesium diboride superconductive wire.

Also, in the above embodiment, the superconductive squirrel-cage winding 73 and the normally conductive squirrel-cage winding 74 are provided independently of each other, but they may be integrally formed. Specifically, the superconductive wires of the superconductive squirrel-cage winding 73 may include a highly conductive metal portion of a predetermined thickness or thicker, which acts as the normally conductive squirrel-cage winding 74.

Also, in the above embodiment, the normally conductive squirrel-cage winding 74 is disposed as an outer portion of the superconductive rotor 7 and the superconductive squirrel-cage winding 73 is disposed inside thereof, but the superconductive squirrel-cage winding 73 may be disposed as an outer portion. In the case where the normally conductive squirrel-cage winding 74 is disposed as an outer portion, the induced torque can be increased for both the normally conductive state and the superconductive state, and in the case where the superconductive squirrel-cage winding 73 is disposed as an outer portion, the synchronous torque can be increased for the superconductive state.

Furthermore, in the above embodiment, each of the superconductive squirrel-cage winding 73 and the normally conductive squirrel-cage winding 74 has one wire accommodated in each slot 72, but this is not restrictive. For example, sets of slots may be provided to respectively accommodate the superconductive squirrel-cage winding 73 and the normally conductive squirrel-cage winding 74. Also, in such a case, the rotor bars 73a of the superconductive squirrel-cage winding 73 and the rotor bars 74a of the normally conductive squirrel-cage winding 74 do not have to be equal in number. Moreover, some of the rotor bars 73a and 74a may be accommodated in the same slots, and the rest may be accommodated in different slots.

Furthermore, in the above embodiment, the stator winding 3b used is made of a normally conductive material, but the stator winding 3b used may be made of a superconductive material. In this case, however, the stator winding 3b needs to have a critical temperature higher than or equal to that of the superconductive squirrel-cage winding 73. Otherwise, when the stator winding 3b is brought into the superconductive state to start driving the superconductive squirrel-cage winding 73, the superconductive squirrel-cage winding 73 is always kept in the superconductive state, so that synchronous or inductive rotation is always performed in the superconductive state.

Also, the superconductive rotating-machine system 21 has the superconductive electric motor 1 directly coupled to the axle 22, but the superconductive electric motor 1 may be coupled to the axle 22 via a transmission.

Also, in the above embodiment, the superconductive rotating machine of the present invention is used as a superconductive electric motor, but it can be used as a superconductive generator. In such a case, a superconductive generator system 31 can be provided, including blades 32, a superconductive generator 1 having a superconductive rotor 7 coupled via a shaft 33 to the blades 32, and a power converter 34 for converting the voltage and the frequency of alternating-current power generated on the stator winding 3b of the superconductive generator 1, as shown in, for example, FIG. 9A.

The superconductive generator system 31 rotates the superconductive rotor 7 through rotation of the blades 32, thereby causing the stator winding 3b to generate alternating-current power. As in the case of the superconductive electric motor system 21 in the above embodiment, the superconductive generator system 31 functions as an induction generator when the superconductive squirrel-cage winding 73 is in the normally conductive state while functioning as a synchronous generator when the superconductive squirrel-cage winding 73 is in the superconductive state.

Figure 9:
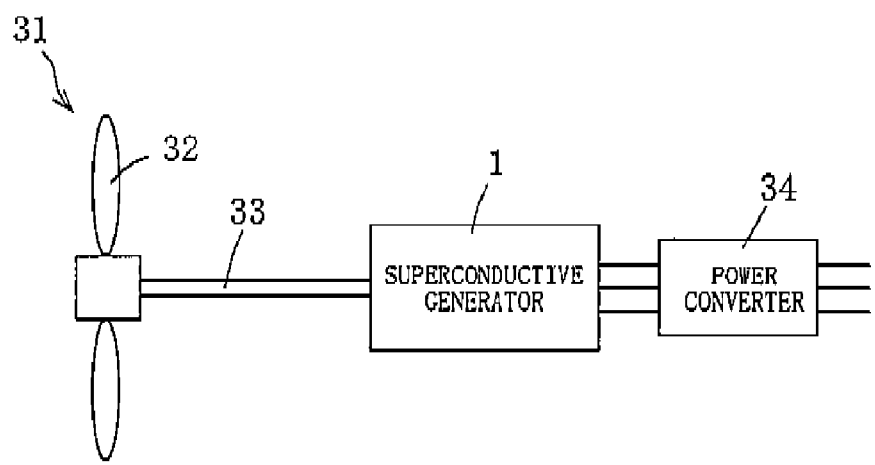
FIG. 9 provides diagrams illustrating variants on the superconductive rotating-machine system of the present invention.
Figure 9:
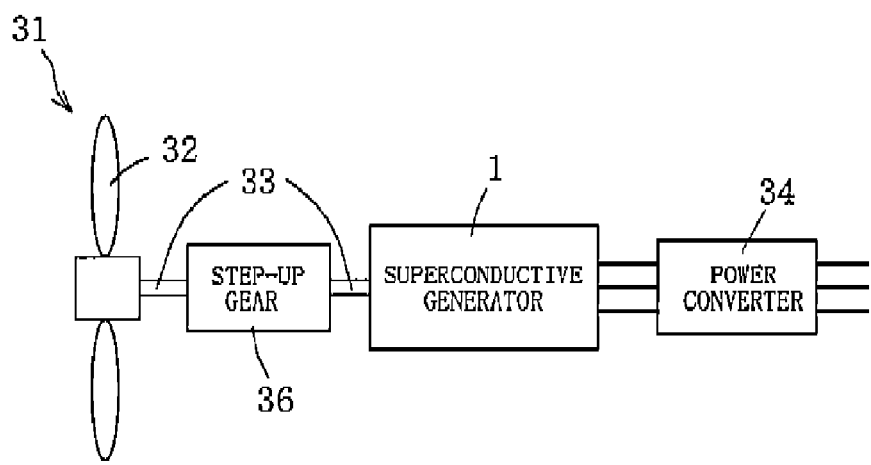

Note that the superconductive generator system 31 can have a step-up gear 36 connected between the blades 32 and the superconductive generator 1, as shown in FIG. 9B, resulting in an increased rotating speed of the blades 32.

The invention claimed is:

1. A superconductive rotor disposed to be rotated in a stator for generating a rotating magnetic field, comprising:
   a superconductive squirrel-cage winding formed by rotor bars and end rings, the rotor bars including one or more superconductive wires having a plurality of superconductive wires covered with a highly conductive metal;
   a normally conductive squirrel-cage winding formed by rotor bars and end rings, which are made of a normally conductive material;
   a cylindrical rotor core having a plurality of slots for accommodating the rotor bars of both of the squirrel-cage windings; and
   a rotor shaft coaxially provided to the rotor core, wherein, when the superconductive squirrel-cage winding is in a non-superconductive state, rotations are mainly made by an induced torque generated on the normally conductive squirrel-cage winding due to a rotating magnetic field and, when the superconductive squirrel-cage winding is in a superconductive state, rotations are mainly made by a synchronous torque generated by the superconductive squirrel-cage winding trapping magnetic flux of the rotating magnetic field.

2. The superconductive rotor according to claim 1, wherein,
   the superconductive wire is made of a low-temperature superconductor based on a metal as typified by NbTi or $Nb_3Sn$, a high-temperature superconductor based on an oxide as typified by yttrium or bismuth, or a magnesium diboride superconductor, and
   the highly conductive metal is silver, copper, gold, aluminum, or an alloy thereof.

3. The superconductive rotor according to claim 1, wherein the normally conductive squirrel-cage winding is formed by increasing the thickness of the highly conductive metal in the superconductive squirrel-cage winding to a predetermined value or more, and is integrated with the superconductive squirrel-cage winding.

4. The superconductive rotor according to claim 1, wherein the superconductive squirrel-cage winding and the normally conductive squirrel-cage winding are provided independently of each other, and the superconductive squirrel-cage winding has a larger cage than that of the normally conductive squirrel-cage winding so that the rotor bars thereof are positioned outside the rotor bars of the normally conductive squirrel-cage winding.

5. The superconductive rotor according to claim 1, wherein the superconductive squirrel-cage winding and the normally conductive squirrel-cage winding are provided independently of each other, and the normally conductive squirrel-cage winding has a larger cage than that of the superconductive squirrel-cage winding so that the rotor bars thereof are positioned outside the rotor bars of the superconductive squirrel-cage winding.

6. The superconductive rotor according to claim 1, wherein the number of rotor bars of the superconductive squirrel-cage winding and the number of rotor bars of the normally conductive squirrel-cage winding are equal to the number of the slots in the rotor core, and each of the slots accommodates one rotor bar of each of the superconductive squirrel-cage winding and the normally conductive squirrel-cage winding.

7. A superconductive rotating machine having a superconductive rotor of claim 1 disposed in a stator including a stator winding for generating a rotating magnetic field.

8. The superconductive rotating machine according to claim 7, wherein the stator winding is made of a superconductive material, and the superconductive material has a critical temperature higher than or equal to a critical temperature of the superconductive wires included in the superconductive squirrel-cage winding.

9. A superconductive rotating-machine system comprising:
a superconductive rotating machine of claim 7;
a cooling device capable of cooling the superconductive rotating machine to a superconductive state; and
a control device for controlling the superconductive rotating machine, wherein,
the control device has a first control pattern to be used when the superconductive rotating machine is mainly rotated by the induced torque and a second control pattern to be used when the superconductive rotating machine is mainly rotated by the synchronous torque, such that the superconductive rotating machine is controlled using the second control pattern when a value of current flowing through the stator winding falls due to the superconductive squirrel-cage winding being brought into the superconductive state, and when otherwise, the superconductive rotating machine is controlled using the first control pattern.

10. The superconductive rotating-machine system according to claim 9, wherein, when the superconductive squirrel-cage winding is in the superconductive state without trapping magnetic flux of the rotating magnetic field at start-up, the control device changes a voltage applied to the stator winding and/or a frequency of the applied voltage such that current flowing through the superconductive squirrel-cage winding exceeds a critical level, thereby bringing the superconductive squirrel-cage winding into a state of magnetic flux flow, allowing the magnetic flux of the rotating magnetic field to link the superconductive squirrel-cage winding.

11. The superconductive rotor according to claim 2, wherein the normally conductive squirrel-cage winding is formed by increasing the thickness of the highly conductive metal in the superconductive squirrel-cage winding to a predetermined value or more, and is integrated with the superconductive squirrel-cage winding.

12. The superconductive rotor according to claim 2, wherein the superconductive squirrel-cage winding and the normally conductive squirrel-cage winding are provided independently of each other, and the superconductive squirrel-cage winding has a larger cage than that of the normally conductive squirrel-cage winding so that the rotor bars thereof are positioned outside the rotor bars of the normally conductive squirrel-cage winding.

13. The superconductive rotor according to claim 2, wherein the superconductive squirrel-cage winding and the normally conductive squirrel-cage winding are provided independently of each other, and the normally conductive squirrel-cage winding has a larger cage than that of the superconductive squirrel-cage winding so that the rotor bars thereof are positioned outside the rotor bars of the superconductive squirrel-cage winding.

14. The superconductive rotor according to claim 2, wherein the number of rotor bars of the superconductive squirrel-cage winding and the number of rotor bars of the normally conductive squirrel-cage winding are equal to the number of the slots in the rotor core, and each of the slots accommodates one rotor bar of each of the superconductive squirrel-cage winding and the normally conductive squirrel-cage winding.

15. The superconductive rotor according to claim 3, wherein the number of rotor bars of the superconductive squirrel-cage winding and the number of rotor bars of the normally conductive squirrel-cage winding are equal to the number of the slots in the rotor core, and each of the slots accommodates one rotor bar of each of the superconductive squirrel-cage winding and the normally conductive squirrel-cage winding.

16. The superconductive rotor according to claim 4, wherein the number of rotor bars of the superconductive squirrel-cage winding and the number of rotor bars of the normally conductive squirrel-cage winding are equal to the number of the slots in the rotor core, and each of the slots accommodates one rotor bar of each of the superconductive squirrel-cage winding and the normally conductive squirrel-cage winding.

17. The superconductive rotor according to claim 5, wherein the number of rotor bars of the superconductive squirrel-cage winding and the number of rotor bars of the normally conductive squirrel-cage winding are equal to the number of the slots in the rotor core, and each of the slots accommodates one rotor bar of each of the superconductive squirrel-cage winding and the normally conductive squirrel-cage winding.

18. A superconductive rotating machine having a superconductive rotor of claim disposed in a stator including a stator winding for generating a rotating magnetic field.

19. A superconductive rotating machine having a superconductive rotor of claim 3 disposed in a stator including a stator winding for generating a rotating magnetic field.

20. A superconductive rotating machine having a superconductive rotor of claim 4 disposed in a stator including a stator winding for generating a rotating magnetic field.

* * * * *